Sept. 20, 1966 L. R. GLOSTEN 3,273,526
STABLE OCEAN PLATFORM
Filed Nov. 15, 1963 4 Sheets-Sheet 1
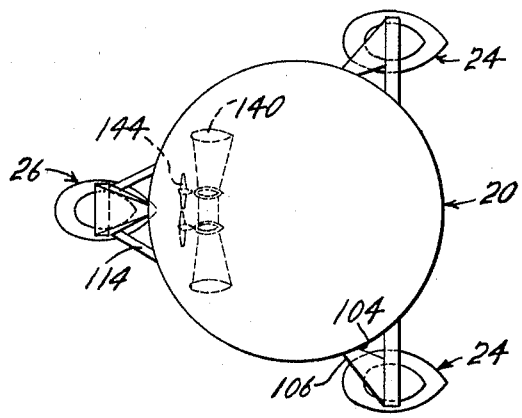
Fig. 1
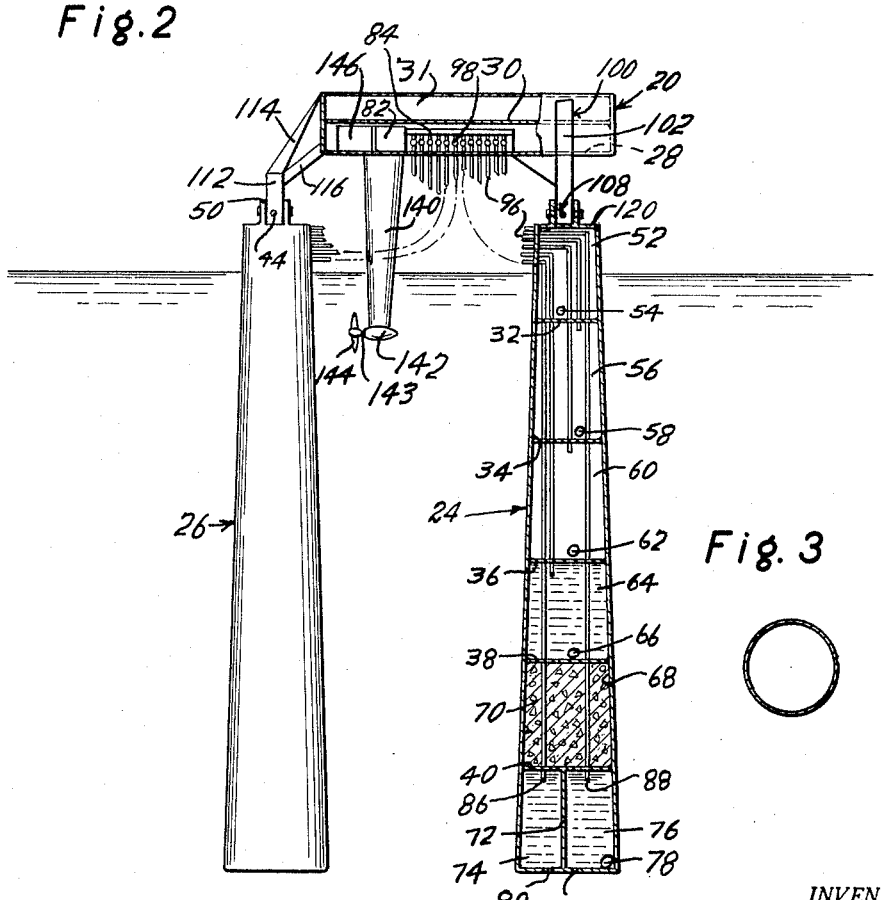
Fig. 2
Fig. 3
INVENTOR.
Lawrence R. Glosten
BY
TW Secrest Sept. 20, 1966  L. R. GLOSTEN  3,273,526
STABLE OCEAN PLATFORM
Filed Nov. 15, 1963  4 Sheets-Sheet 2
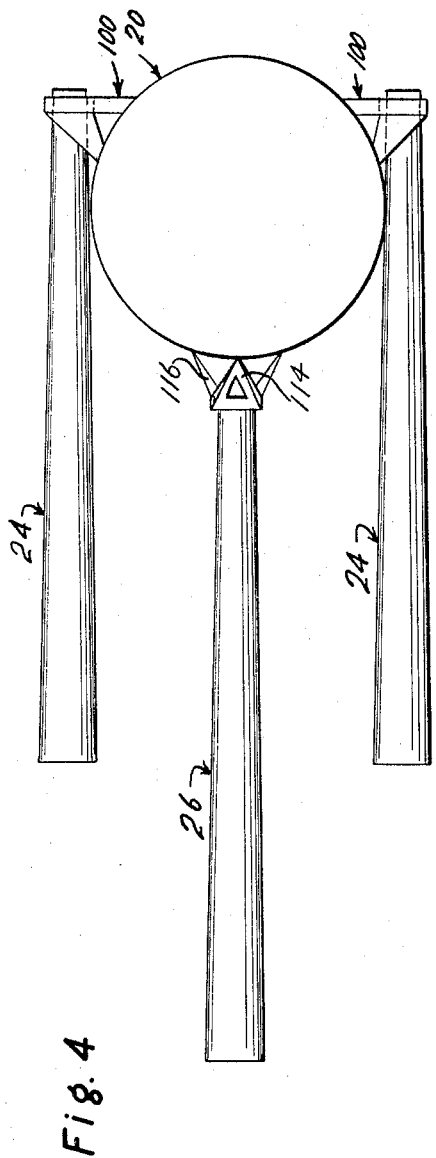
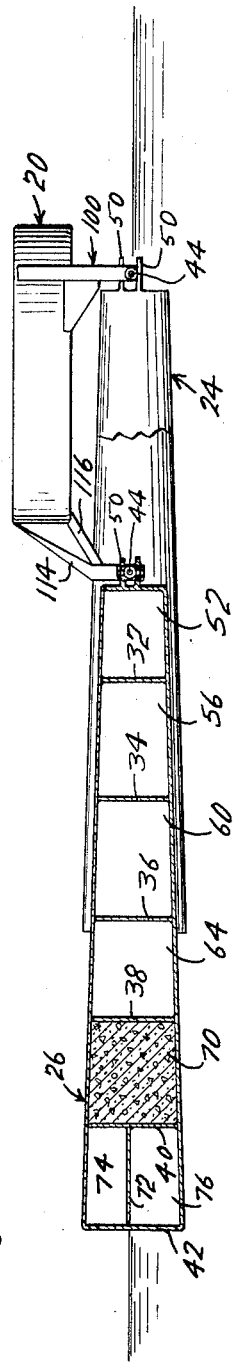
Fig. 4
Fig. 5
INVENTOR.
Lawrence R. Glosten
BY TW Savest INVENTOR.
Lawrence R. Glosten
BY
TW Seirest Sept. 20, 1966 L. R. GLOSTEN 3,273,526
STABLE OCEAN PLATFORM
Filed Nov. 15, 1963 4 Sheets-Sheet 4
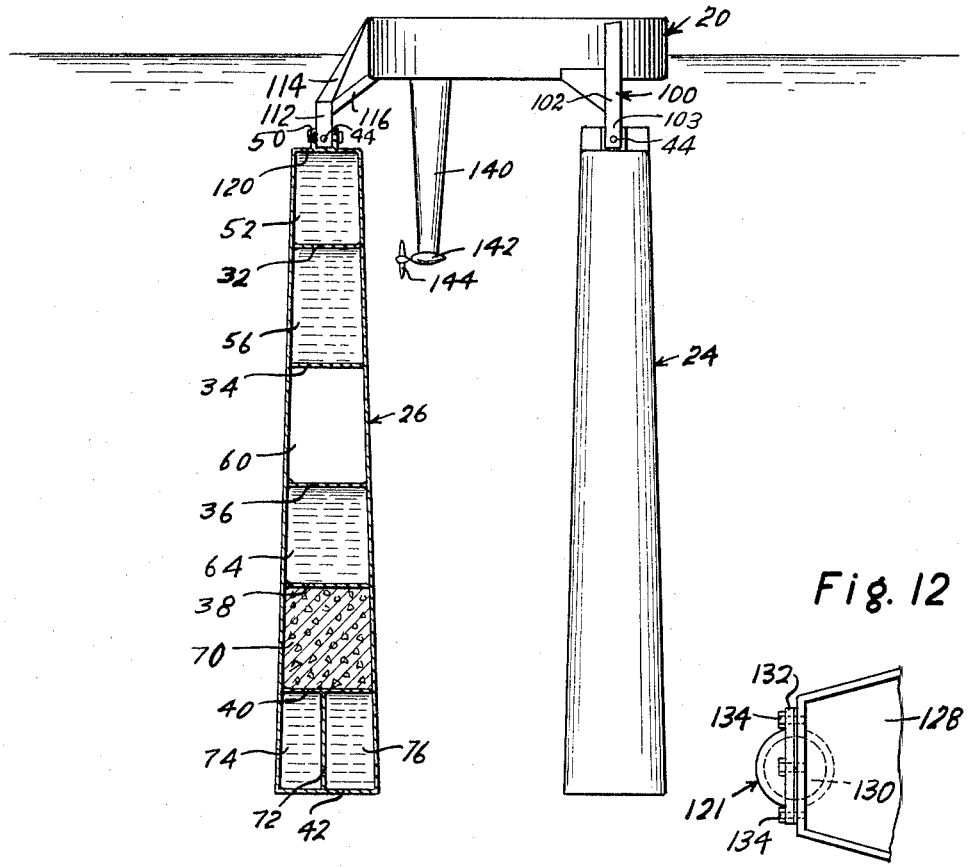
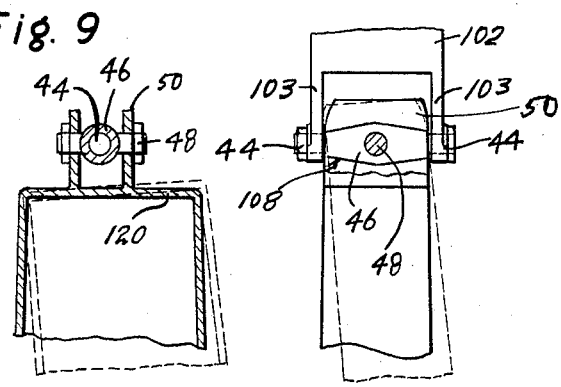
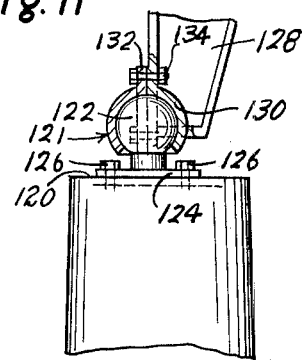
INVENTOR.
Lawrence R. Glosten
BY
TW Secrest United States Patent Office 3,273,526
Patented Sept. 20, 1966

3,273,526
STABLE OCEAN PLATFORM
Lawrence R. Glosten, 71 Columbia St., Seattle 4, Wash.
Filed Nov. 15, 1963, Ser. No. 324,038
5 Claims. (Cl. 114—.5)

This invention is for a marine platform intended to ride substantially motionless at sea and virtually unaffected by passing waves.

In the tracking of missiles, it is desirable to have a vessel or a platform having a housing for electronic equipment instrumentation, tracking equipment and other mechanisms and which platform can be positioned in the ocean and maintained in that position with a minimum of effort. With this desired object in mind, I have invented a stable ocean platform which can be easily towed or self-propelled to a desired location in the ocean and, by rearranging the configuration of this platform, relatively fixedly positioning the same at a desired location in the ocean. Accordingly, an object of this invention is to provide a superstructure housing which at all times remains in a substantially horizontal position; a superstructure housing which makes it relatively simple to mount electronic and other equipment; a stable superstructure housing for equipment and which housing is almost motionless at sea and is virtually unaffected by passing waves; a platform which is easy to move from position to position; a platform which is easy to maintain at a fixed position; a housing which can be used in rough water without damage from the waves; a stable housing for delicate instruments and which housing reduces wear and tear on the instruments; a stable housing which provides minimum strenuous physiological effects on personnel; and, a stable housing for making accurate observations and recordings.

These and other important objects and advantages of the invention will be more fully brought forth upon reference to the drawings, the detailed specification of the invention and the accompanying claims.

In the drawings:

FIGURE 1 is a plan view looking down on a specific embodiment of the invention constructed in accordance with the preferred teachings thereof and illustrated in the stable operating position;

FIGURE 2 is a side-elevational view of the invention or platform in the stable operating position, and shows a superstructure housing and hulls for supporting said housing out of the water;

FIGURE 3 is a cross-sectional view of a hull of a circular configuration;

FIGURE 4 is a plan view looking down on the platform with the hulls in an essentially horizontal position so that the platform may be towed or self-propelled to a desired position in the ocean;

FIGURE 5 is a side-elevational view of the platform with the hulls in an essentially horizontal position with respect to the superstructure housing so that the platform may be towed or self-propelled to a desired position in the ocean;

FIGURE 8 is a side-elevational view of the platform and illustrates the superstructure housing partially immersed in the water and the hull submerged in the water in a vertical position underneath the housing;

Figure 7:
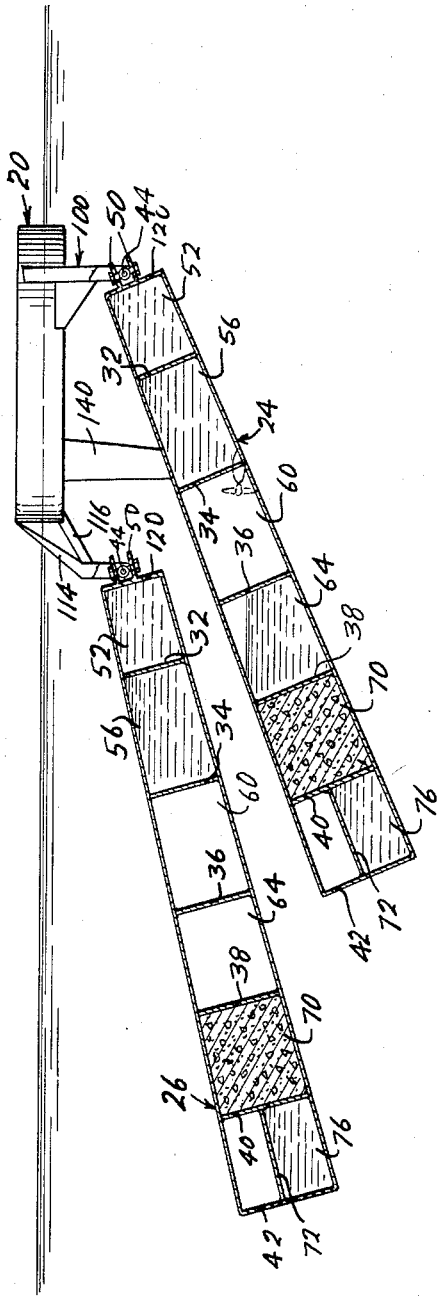
FIGURE 7 is a side-elevational view of the platform and shows the superstructure housing partially immersed in the water and contributing buoyant support to the hulls which are taking on water as the hulls move from the horizontal to the vertical position.

FIGURE 9, on an enlarged scale, is a vertical section through a universal-joint connection between the hull and the superstructure housing;

FIGURE 10 is an enlarged detail elevation of the universal joint connection between the hull and the superstructure housing, parts being broken away;

FIGURE 11 is an enlarged detail elevation illustrating a ball-and-socket connection between the hull and the superstructure housing; and, FIGURE 12 is a plan view looking down on a ball-and-socket connection between the hull and the superstructure housing.

In FIGURE 1 it is seen that there is a platform having a circular superstructure housing 20 and a plurality, preferably at least three, of elongated supporting flotation hulls: two forward hulls 24 and an after hull 26 being shown. The housing 20 has a lower level 28; an upper level 30; and, a deck level. The housing 20 may house electronic equipment for tracking missiles and for making physical observations in the ocean and for other purposes: living quarters for the crew; and machinery space for generating power, for operating the pumping and compressed air system and for propelling the platform.

The hulls 24 and 26 are of the same construction and, therefore, the same reference numerals may be used for like parts in these hulls. The hulls 24 and 26 are principally hollow. In FIGURE 1 they are of a modified elliptical streamlined cross section having a major axis and a minor axis and in FIGURE 3a a circular hull cross section is shown. These hulls may be tapered upwardly as in FIGURE 2 or may be of constant cross section from end to end. As is seen in FIGURE 2, each hull may be divided into ballast tank compartments by the upper end cap 120, the lower end cap 42 and transverse bulkheads 32, 34, 36, 38 and 40 spaced at intervals between such end caps.

Also, on the upper or relatively fixed end of the hull, see FIGURE 9, there is an upper cap having a flat portion 44. The upper cap 120 in conjunction with the bulkhead 32 and the walls of the hull wall 24 define a first ballast tank 52. Through the wall of the hull and adjacent to the bulkhead 32, there is a passageway 54 connecting with the ballast tank 52.

The bulkheads 32 and 34 and the hull wall define a second ballast tank 56. Through the hull and adjacent to the bulkhead 34 there is a passageway 58 connecting with the ballast tank 56. The bulkheads 34 and 36 in conjunction with the hull wall define a next lower ballast tank 60. Through the hull there is a passageway 62 which connects with the tank 60.

The bulkheads 36 and 38 and the hull wall define a ballast tank 64 below ballast tank 60. Through the hull and adjacent to the bulkhead 38, there is a passageway 66 which connects with the ballast tank 64. The bulkheads 38 and 40, in conjunction with the hull wall, define a compartment 68 filled with a body of solid ballast of a density greater than that of water, such as a concrete mixture 70.

The bulkhead 40 and the end plate 42 in conjunction with the hull wall and a longitudinal bulkhead 72 which runs between the bulkhead 40 and end plate 42 define ballast tanks 74 and 76.. Through the hull, and adjacent to the end plate 42, are passageways 78 and 80 which connect with the ballast tanks 76 and 74, respectively.

In the superstructure housing 20 there is a motor and compressor combination 82, schematically illustrated in FIGURE 2, for supplying air under pressure to a pneumatic manifold 84. Connecting with this manifold are hoses or pipes for conveying air or gas to the various individual ballast tanks of the several columns. For example, it is seen in FIGURE 2 that connecting with the ballast tank 74 of each hull there is a pipe 86. Also, connecting with the ballast tank 76 of each hull there is a pipe 88; connecting with the ballast tank 64 of each hull there is a pipe 90; connecting with the ballast tank 60 of each hull there is a pipe 92; connecting with the ballast tank 56 of each hull there is a pipe 94; and, a pipe 96 connects with the ballast tank 52 of each hull. It is to be realized that all of these pipes, 86, 88, 90, 92, 94, and 96 connect with the air manifold 84 through a flexible piping means and a valve. In fact, these pipes may be of a heavy hose construction. As these valves are of similar construction, they will be referred to by reference numeral 98.

On what may be considered to be the after portion of the superstructure housing 20, and on each side, is positioned a support means tied into the superstructure housing. The side support means 100 may be of a suitable steel construction and may be welded or bolted, or a combination of these, to the housing. Also, as shown in FIGURES 1 and 2 there is an inner strut 104 between the housing 20 and a supporting leg 102. Further, there is an outer strut 106 between the housing 20 and the supporting leg 102. As shown in FIGURE 10, the lower part of the leg 102 expands into a "Y" or two legs 103. These legs 103 cradle trunnions 44 of the major cross 46 of the universal joint 108 which extend parallel to the minor axes of the streamlined hull cross sections as shown in FIGURE 10. The minor cross 48 of the universal joint 108 connects with bearings in two spaced-apart plates 50 on the upper end of the hull attached to the housing 20 by universal joint 108, and extends parallel to the major axis of the streamlined hull cross section. The plates 50 may be welded to the hull end plate 120.

On the stern or aft portion of the superstructure housing 20 are two sets of upper struts 114 and two sets of lower struts 116 connecting the housing and the supporting leg 112, as shown in FIGURES 1 and 2. On the lower end of the leg 112 there is a universal joint 108 having a major cross and a minor cross as shown in FIGURES 9 and 10. The minor cross is positioned in bearings in the plates of the hull 26 in a manner similar to that for the positioning of the minor cross in the hulls 24.

It is to be realized that the support means 100, and members 102, 104, 112 and 114 may be of different design depending upon the size of the platform and the particular use to which the platform is to be placed.

In FIGURES 11 and 12 there is illustrated a ball-and-socket joint 12' connecting the superstructure housing 20 to the upper portion or attached end of a hull 24 or 26. In this particular instance, a ball connection 122 is integral with a lower plate 124 secured to the hull's upper end cap 120 by means of bolts 126. A depending leg 128, which may be considered to be the equivalent of leg 112 or leg 102, is attached to the housing 20 in a manner similar to that in which leg 112 or 102 is attached to the housing. The lower end of the leg 128 is recessed at 130 to receive one side of ball 122 and a socket plate 132, attached to the leg 128 by means of bolts 134, receives the opposite side of the ball.

Figure 6:
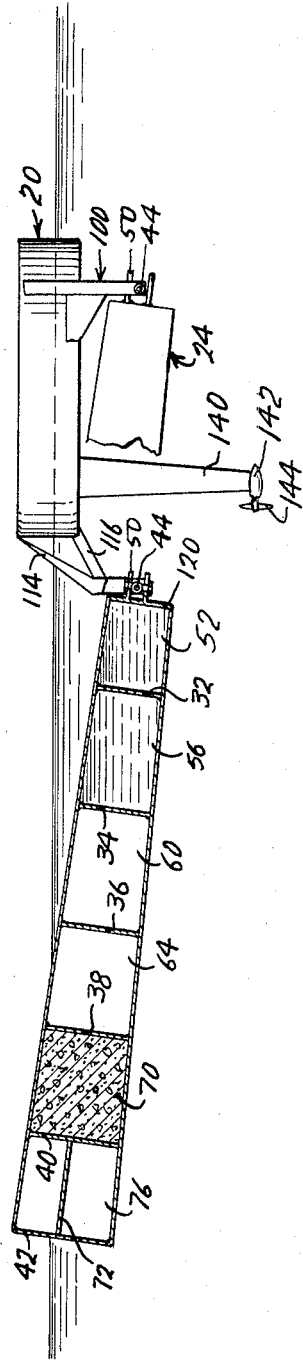
FIGURE 6 is a side-elevational view of the platform and shows the hulls partially flooded and with the free end of the hull buoyant and the superstructure housing partially immersed in the water.

From the description of the universal joint 108 it is seen that the hulls 24 and 26 are free to swing at least to some degree around any horizontal axis at the connecting joints relative to the housing 20, and to swing through 90° about the trunnions 44 of the major cross between the positions of FIGURE 6 and FIGURE 8. Mounting of such trunnions between the legs 103 maintains all the hulls with the axes of such trunnions parallel. Consequently all the axes of the minor crosses 48 and all major axes of the hull cross sections will always be parallel, even when the hulls swing from platform-elevating positions underneath the housing 20 upwardly about trunnions 44 with respect to the housing backwardly or forwardly. When the hulls are supported by ball-and-socket joints 121 as shown in FIGURES 11 and 12, the hulls can swing either backwardly, forwardly or outwardly away from the housing into positions with their lengths generally horizontal and the several hulls disposed in substantially co-planar relationship, and preferably parallel relationship.

To the lower part of the housing 20, there is connected a depending structure 140 having on its lower end a housing 142 for a propeller shaft 143 and a propeller 144. The housing 20 contains a power plant and transmission for driving the propeller to hold the platform on station with the hulls upright or to propel the platform from place to place with the hulls in the horizontal position.

While towing or propelling the platform to an operating location the hulls 24 and 26 are in a trailing position with respect to the housing 20, the preferred relationship of the parts being shown in FIGURE 5. On the front of the housing 20 there is an eye 150 for securing a tow wire 152, from a towing vessel. In FIGURE 5, and with the hulls 24 and 26 trailing behind the superstructure housing 20, it is seen that the ballast tanks, 52, 56, 60, 64, 76 and 74 have been blown out so that they are filled with a gas or air. As a result, the superstructure housing 20 is out of the water. For example, the bottom of the housing 20 may be approximately 20 feet above the level of the water.

The steps of converting the platform from the mobile configuration to the stationed configuration are illustrated in sequence in FIGURES 5, 6, 7, 8 and 2.

In FIGURE 6, the two ballast tanks 52 and 56 have been filled with water. With the ballast tanks 52 and 56 filled with water, it is seen that the relatively fixed end of the hulls is partially immersed and the superstructure housing 20 is also partially immersed in the water. In effect the superstructure housing 20 is now self-supporting and contributes to the support of the hulls.

In the next step, see FIGURE 7, the ballast tanks 76 and, also, the ballast tanks 64 are filled with water so that the swinging, free or lower end of each hull descends.

In FIGURE 8 it is seen that the ballast tanks 74, 76, 64, 56 and 52 have been filled with water and that the hulls are in upright position in the water. The housing 20 is also partially immersed and contributes to the support of the hulls.

In the next step, see FIGURE 2, water is blown out of the upper ballast tanks 52, 56 and 60 of all the hulls simultaneously so as to increase the buoyancy of the hulls, only the lower ballast tanks 74 and 76 and 64 being filled with water. In this manner the superstructure housing 20 is raised out of the water approximately 40 feet. The concrete 70 in the ballast tank 68, near the free end of the hull, adds stability to the hull, and also the water in the tanks 64, 74 and 78 near the free end of the hull, adds stability to the hull and to the platform.

To change the platform from a stationed condition with the hulls depending in the water in upright positions to a mobile condition with the hulls in trailing positions, the above steps are repeated in a reverse order. That is, the upper tanks of the hulls are flooded and subsequently the water is forced or vented out of the tanks. The steps are as shown in FIGURE 2, to FIGURE 8, to FIGURE 7, to FIGURE 6 and to FIGURE 5.

The passageways 58, 62, 66, 78 and 80 may be free passageways without valves to allow water to ingress and egress from the ballast tanks based on the assumption that the ballast tanks are full of air as illustrated in FIGURE 5. To allow water to enter the ballast tanks, the air may be vented out of a particular ballast tank so as to reduce the gas pressure therein. Then, the water naturally flows into this particular ballast tank. Likewise, assuming that the ballast tanks are full of water as illustrated in FIGURE 8, air may be pumped into the ballast tank and the water is naturally forced out.

For a particular application, dimensions of the platform may be as follows: the diameter of the superstructure housing 20 may be approximately 100 feet and the thickness may be aproximately 18 feet so as to allow two flights for housing electronic equipment; mechanical, electrical and pneumatic operating equipment, and the like;

and, sleeping and living quarters for the man. With the position of the platform as shown in FIGURE 1, the bottom of the housing 20 may be approximately 40 feet above the level of the water, and the propeller may be approximately 20 feet below the level of the water. The hulls may be approximately 225 feet long; and, in the position shown in FIGURE 1, the top of the hulls may be approximately 20 feet above the level of the water. This means that the hulls are submerged approximately 205 feet in the water. With the hulls being submerged approximately 205 feet in the water wave action will produce no substantial heaving or vertical oscillation of the platform because the variation in pressure on the bottom of each hull is negligible, the area of the hull bottom is small and pressure variations caused by the passage of waves diminish at the lower depths. The superstructure housing 20 has substantially no rolling or pitching movement. Tilting of the hulls cannot cause the superstructure housing 20 to tilt because of the angular movement permitted by the universal joints. Due to the vertical shape of the hulls and the small water plane with a large displacement or weight, there results a long period roll of the platform. With this long roll, there is excellent damping of the movement.

As is realized from the foregoing, the platform may be used for oceanographic research, weather stations, and oil exploration in addition to missile tracking.

From the design standpoint, it is known that the superstructure housing may be of various configurations in the plan view such as square, rectangular and the like instead of the circular configuration. Also, there may be more or less than two deck levels in addition to the top or roof.

The hulls may comprise more or less than seven compartments depending on the use to which the hulls are to be placed. Also, there may be more than three hulls for a stable ocean platform depending on the circumstances to which the platform is to be placed.

Finally, the platform may be towed with the hulls in front of the superstructure housing 20 instead of trailing behind the housing.

Having presented my invention, what I claim is:

1. A marine platform comprising a superstructure housing, three elongated flotation hulls, each of said hulls having transverse bulkheads spaced lengthwise thereof and dividing the hull into ballast tanks, pivot means connecting the upper ends of said hulls to equally spaced circumferential portions of said superstructure housing and guiding said hulls for swinging relative to said superstructure housing about said pivot means between positions projecting downward from said superstructure housing with their lengths upright and substantially coplanar positions with their lengths generally parallel and horizontal, and means operable to supply gas simultaneously to corresponding ballast tanks of all of said hulls for effecting simultaneous and coordinated swinging thereof toward horizontal positions and further operable to provide a supply of water simultaneously to corresponding ballast tanks of all of said hulls for effecting simultaneous and coordinated swinging of said hulls relative to said superstructure housing about said pivot means toward upright positions.

2. A marine platform comprising a superstructure housing, a plurality of elongated flotation hulls, means connecting said superstructure housing and the upper portions of said hulls and guiding said hulls for swinging of their lower portions relative to said housing between positions below and supporting said housing with their lengths upright and substantially coplanar positions with their lengths generally horizontal, each of said hulls having in it a plurality of transverse bulkheads spaced lengthwise of such hull and defining ballast tanks therebetween, and means operable at will to supply gas or water selectively to said ballast tanks.

3. The marine platform defined in claim 2, and a body of solid ballast having a density greater than water in the lower portion of each hull.

4. A marine platform comprising a superstructure housing, a plurality of elongated flotation hulls, means connecting said superstructure housing and the upper portions of said hulls and guiding said hulls for swinging of their lower portions relative to said housing between platform-elevating positions below and supporting said housing with their lengths upright and substantialy coplanar positions with their lengths generally horizontal, and variable-buoyancy means operable to alter the buoyancy of portions of said hulls remote from said connecting means to effect swinging thereof between their platform-elevating positions and their coplanar positions.

5. A marine platform comprising a superstructure housing, a plurality of elongated flotation hulls of modified elliptical streamlined cross section including major and minor axes, and means connecting said superstructure housing and the upper portions of said hulls, guiding said hulls for swinging of their lower portions relative to said housing about horizontal axes between positions below and supporting said housing with their lengths upright and substantially coplanar positions with their lengths generally horizontal and maintaining said hulls, in all swung positions thereof, with the major axes of all of said hulls disposed in substantially parallel upright planes perpendicular to the axes about which said hulls swing.

References Cited by the Examiner

UNITED STATES PATENTS

| | | | |
|---|---|---|---|
| 942,687 | 12/1909 | White | 114—.5 |
| 2,678,017 | 5/1954 | Collins | 114—43.5 |
| 2,921,442 | 1/1960 | Laborde et al. | 114—43.5 X |
| 2,973,169 | 2/1961 | Handler | 244—105 |
| 3,128,604 | 4/1964 | Sandberg | 61—46.5 |

OTHER REFERENCES

"Aviation Week and Space Technology," vol. 74, No. 5, Jan. 30, 1961, p. 87.

MILTON BUCHLER, *Primary Examiner.*

FERGUS S. MIDDLETON, *Examiner.*

T. M. BLIX, *Assistant Examiner.*